(12) United States Patent
Cavallin et al.

(10) Patent No.: US 10,697,211 B2
(45) Date of Patent: Jun. 30, 2020

(54) VEHICLE STOWAGE COMPARTMENT AND DOOR LATCH MECHANISM

(71) Applicant: GM Global Technology Operations LLC, Detroit, MI (US)

(72) Inventors: Benjamin E. Cavallin, Rochester Hills, MI (US); Jason C. Bone, Clarkston, MI (US); William A. Jonardi, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 28 days.

(21) Appl. No.: 16/051,859

(22) Filed: Aug. 1, 2018

(65) Prior Publication Data

US 2020/0040620 A1 Feb. 6, 2020

(51) Int. Cl.
*E05B 83/28* (2014.01)
*E05D 15/06* (2006.01)
*B60R 7/04* (2006.01)
*B65D 45/16* (2006.01)

(52) U.S. Cl.
CPC .............. *E05B 83/28* (2013.01); *B60R 7/04* (2013.01); *B65D 45/16* (2013.01); *E05D 15/0621* (2013.01); *E05Y 2900/538* (2013.01)

(58) Field of Classification Search
CPC . E05B 83/30; E05B 83/28; B60R 7/06; B60R 7/04; E05D 15/0621; E05D 15/06; B60N 2/793; B65D 45/16; B65D 45/00; B65D 45/22; B65D 43/22; B65D 43/20
USPC ....... 220/326, 843, 844, 848, 324, 315, 813, 220/812, 811, 737; 296/37.12, 37.13, 70
See application file for complete search history.

(56) References Cited

U.S. PATENT DOCUMENTS

| | | | | |
|---|---|---|---|---|
| 5,116,099 A | * | 5/1992 | Kwasnik | A47C 7/543 297/188.15 |
| 6,609,631 B2 | * | 8/2003 | Asami | B60N 2/793 220/817 |
| 8,579,151 B2 | * | 11/2013 | Kodama | A45C 13/16 108/44 |
| 2006/0012202 A1 | * | 1/2006 | Sakakibara | B60R 7/04 296/24.34 |
| 2015/0041469 A1 | * | 2/2015 | Fukumoto | B60R 7/04 220/260 |

* cited by examiner

*Primary Examiner* — Robert J Hicks

(57) ABSTRACT

A stowage compartment for a vehicle includes a bin, a bin frame, and a door assembly. The bin includes an opening and an interior compartment. The bin frame comprises an opening, a first and second door guide, and a first and second latch feature. The door assembly is capable of locking in a closed position as well as an open position. The door is able to be operated by one hand.

20 Claims, 4 Drawing Sheets

VEHICLE STOWAGE COMPARTMENT AND DOOR LATCH MECHANISM

INTRODUCTION

The present disclosure relates generally to passenger vehicle interior design and more particularly to compartment door latch mechanisms.

When it comes to the design of interiors of vehicles, there are nearly as many varieties of stowage compartments, bins, cup holders and compartments as there are vehicles. The complexity of these design range from simple to complex. However, very few if any stowage compartments are capable of locking in both an open and a closed position. Additionally, simplicity of assembly and cost considerations also drive the creating of new designs and mechanisms.

Accordingly, there is a need in the art for improved vehicle stowage compartments having more functionality, lower cost to produce and assemble, and reduction in design complexity.

SUMMARY

The present disclosure comprises a stowage compartment for a vehicle. The stowage compartment includes a bin, a bin frame, and a door assembly. The bin includes an opening and an interior compartment. The bin frame comprises an opening, a first and second door guide, and a first and second latch feature. The opening is disposed proximate a first end of the bin frame. The opening of the bin is aligned with the opening of the bin frame to provide access to the interior compartment of the bin through the opening. The first door guide is disposed on a first side of the opening. The second door guide is disposed on a second side of the opening opposite the first side. The first latch feature is disposed proximate a third side of the opening which is opposite the first end of the bin frame. The second latch feature is disposed proximate a second end of the bin frame. The door assembly comprises a door, a latch, a resilient member, and an axle. The door of the door assembly comprises a handle and a first, second, third, and fourth pins, the first and second pins are slidingly disposed in the first door guide. The third and fourth pins are slidingly disposed in the second door guide. The latch comprises a button, a first and second latch surfaces. The button of the latch is disposed within the handle of the door. The axle is disposed through each of the door and the latch such that the latch is pivotably mounted to the door. The resilient member provides a force to oppose the handle of the door from the button of the latch. The door assembly is disposed in one of a first and a second position. The first position includes the door assembly disposed in the opening of the bin frame and the first latch surface of the latch opposes the first latch feature of the bin frame preventing the door assembly from sliding relative to the bin frame. The second position includes the door assembly disposed proximate the second end of the bin frame and the second latch surface of the latch opposes the second latch feature of the bin frame from preventing the door assembly from sliding relative to the bin frame.

In one example of the present disclosure, the first pin of the door extends from a first edge of the door proximate a second edge of the door, the second pin extends from the first edge of the door proximate a third edge of the door opposite the second edge of the door, the third pin of the door extends from a fourth edge of the door opposite the first edge of the door and proximate the second edge of the door, and the fourth pin of the door extends from the fourth edge of the door proximate the third edge of the door.

In another example of the present disclosure, the handle of the door comprises a first and a second side. The handle is disposed proximate the second edge of the door extending from an outer surface of the door. The first side of the handle has a continuous surface. The second side of the handle has an opening. The latch of the door assembly disposed having the button of the latch disposed on the interior of the handle. The button including a continuous surface disposed in the opening of the second side of the handle.

In yet another example of the present disclosure, the stowage compartment further comprises a hinge member. The hinge member comprises a first end and a second end. The first end is rotatably supported by the third edge of the door. The second end is rotatably supported by a recessed housing of the bin frame.

In yet another example of the present disclosure, the latch of the door assembly further comprises a first end, a second end, a lever arm, a first flange, and a second flange. The button of the latch is disposed at the first end of the latch. The lever arm extends from the button to the second end of the latch. The first flange extends from a first side of the lever arm proximate the second end of the flange. The second flange extends from a second side of the lever arm proximate the second end of the flange. The second latch surface is disposed in the first flange, a third latch surface is disposed in the second flange. The first latch surface is disposed on the second edge of the latch.

In yet another example of the present disclosure, the first latch feature of the bin frame comprises a first contact surface and the first contact surface extends perpendicularly from a top surface of the bin frame and opposes a door stop disposed on a fourth side of the opening of the bin frame.

In yet another example of the present disclosure, the second latch feature of the bin frame comprises a second contact surface extending perpendicularly from the top surface of the bin frame, the second contact surface faces the opposite direction of the first contact surface of the first latch feature.

In yet another example of the present disclosure, the bin frame further comprises a third latch feature comprising a third contact surface extending perpendicularly from the top surface of the bin frame and the third contact surface faces the same direction of the second contact surface of the second latch feature.

In yet another example of the present disclosure, when the door assembly is in the second position the second latch surface of the latch opposes the second contact surface of the second latch feature of the bin frame, the third latch surface of the latch opposes the third contact surface of the third latch feature of the bin frame.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
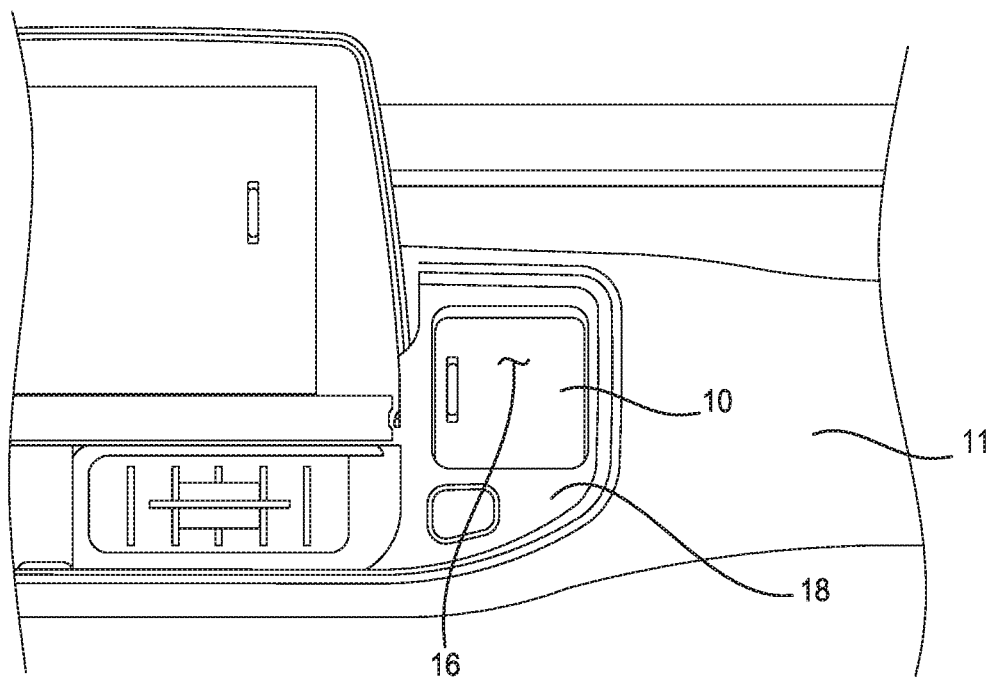
FIG. 1 is an exterior frontal view of a vehicle dash panel according to the principles of the present disclosure.
Figure 2:
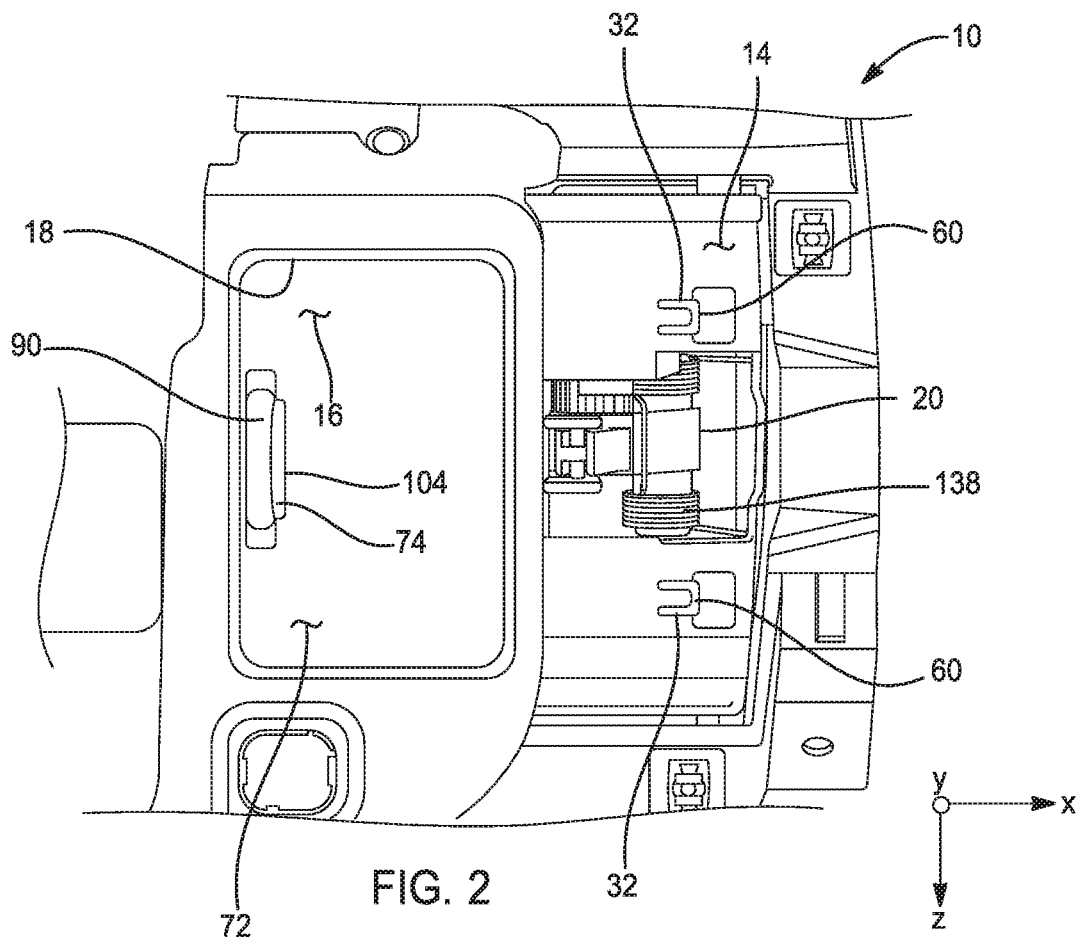
FIG. 2 is a partially cut-away frontal view of a vehicle interior stowage compartment according to the principles of the present disclosure.

Referring to the drawings, wherein like reference numbers refer to like components, in FIGS. 1-7 a stowage compartment for the interior of a vehicle is illustrated and will now be described. The stowage compartment, referred to with reference number 10, is disposed in a dash panel 11 for a vehicle. However, the stowage compartment 10 may be placed in any one of a number of places of the vehicle interior without departing from the scope of the invention. For example, the stowage compartment 10 may be disposed in a center counsel between the front or rear seats, in an interior door panel, on the rear facing surface of a seat or headrest, in the bed of a pick-up truck, in the storage area of a cross-over or sport utility vehicle, or anywhere else additional secure stowage is required.

In the example illustrated, the stowage compartment 10 includes a bin 12, a bin frame 14, a door assembly 16, a door frame 18, and a hinge member 20. More particularly, the bin 12 is supported by the bin frame 14 with the bin frame 14 providing access to the bin 12 through an opening 22 located proximate a first end 56 of the bin frame 14. In addition to the opening 22, the bin frame 14 includes a first and a second door guide 24, 26, a door stop 28, a first latch feature 30, a pair of second latch features 32, and a pair of hinge bores 34. The first and second door guides 24, 26 are disposed on a top surface 36 of the bin frame 14 on opposite first and second sides 38, 40 of the opening 22. The first door guide 24 includes a channel 42 having an open side 44 that faces the Z direction and an open side 46 of a channel 48 of the second door guide 26. The door stop 28 is disposed on a third side 50 of the opening 22 of the bin frame 14 and extends in the Y direction.

The first latch feature 30 is disposed on a fourth side 52 of the opening 22 that is opposite the third side 50 and the door stop 28. A contact surface 54 of the first latch feature 30 faces the door stop 28 or the –X direction. The pair of second latch features 32 are disposed proximate a second end 58 of the bin frame 14 which is opposite the first end 56 of the bin frame 14. Contact surfaces 60, 62 of the pair of second latch features 32 face the opposite or X direction from the contact surface 54 of the first latch feature 30. Each of the latch features 30, 32 include a ramp 64, 66 on the opposite sides of the latch features 30, 32 from the contact surfaces 54, 60, 62, of the respective latch features 30, 32. The ramps 64, 66 are shown as ribs having a sliding surface 68 at an angle from between 20° and 45° relative to the top surface 36 of the bin frame 14.

The pair of hinge bores 34 are disposed in a recessed housing 70 and axially aligned to each other, with the axis i of the pair of hinge bores 34 parallel with the Z axis. The recessed housing 70 is disposed proximate the second end 58 of the bin frame 14.

The door assembly 16 includes a door 72, a latch 74, a resilient member or spring 76, and a pin or axle 78. The door 72 has a rectangular shape with a first side 80, a second side 82 opposite the first side 80, a third side 84 perpendicular to the first side 80, and a fourth side 86 opposite the third side 84. The third and fourth sides 84, 86 each include a pair of pins 88. One pin 88 on each of the third and fourth sides 84, 86 are disposed proximate the intersection 91 of the third and fourth sides 84, 86 and the first side 80. Likewise, the other pin 88 on the third and fourth sides 84, 86 is disposed proximate the intersection 93 of the third and fourth sides 84, 86 and the second side 82. The pins 88 of the third side 84 extend in the Z direction and the pins 88 of the fourth side 86 extend in the Z direction. The door 72 is disposed in the bin frame 14 such that the pins 88 of the third side 84 of the door 72 are slidingly disposed in the channel 42 of the first door guide 24. In the same manner, the pins 88 of the fourth side 86 of the door 72 are slidingly disposed in the channel 44 of the second door guide 26.

The door 72 further includes a handle 90, a hinge feature 92, and a pair of tabs 100. Then handle 90 has a closed first side 94 and an open second side 96 opposite the first side 94. The first side 94 faces the door stop 28 of the bin frame 14. The hinge feature 92 includes a pair of flanges 96 extending from the second side 82 of the door 72. A pair of pins 98 extends from each of the flanges 96 toward the opposite flange 96. The pair of tabs 100 extend from the second side 82 of the door 72 in the –Y direction. The pair of tabs 100 each include a rectangular receiving bore 102 through which passes a feature of the latch 74 which will be further described below.

Regarding the latch 74, the latch 74 includes a release button 104, a lever arm 106, a pair of rectangular holes 108, a first latch surface 110, and a pair of tabs 112. The release button 104 is located at a first end 114 of the latch 74 and when assembled in the door assembly 16 has a first surface 116 that is exposed through the open second side 96 of the handle 90 of the door 72. The tabs 112 extend from a second end 118 of the latch 74 which is opposite the first end 114. Again, when assembled the tabs 112 of the latch 74 are disposed through and supported by the rectangular receiving bore 102 of the tabs 100 of the door 72. The first latch surface 110 faces the X direction and is disposed at the second end 118 of the latch 74. A first of the pair of rectangular holes 108 is disposed in a first flange 120 extending in the Z direction from a first side 122 of the latch 74. A second of the pair of rectangular holes 108 is disposed in a second flange 124 extending in the –Z direction from a second side 126 of the latch 74. Each of the rectangular holes 108 include a second latch surface 128 disposed on an inside edge of the rectangular holes 108 that faces the –X direction.

In the door assembly 16, the pin or axle 78 is rotatably supported by each of the door 72 and the latch 74 proximate the handle 90 of the door 72 and the release button 104 such that the latch 74 pivots about the pin or axle 78 with respect to the door 72. The resilient member 76 is disposed between the handle 90 of the door 72 and the release button 104 such that the resilient member 76 pushes the release button 104 away from the handle 90 in the X direction. In the present example, the resilient member 76 is a spring, however other types of resilient members can be considered without departing from the scope of the present disclosure.

When the door assembly 16 is assembled with the bin frame 14, the pins 88 of the door 72 are slidingly disposed in the channels 24, 26 of the bin frame 14. More particularly, the pins 88 of the third side 84 of the door 72 are slidingly disposed in the channel 42 of the first door guide 24. The pins 88 of the fourth side 86 of the door 72 are slidingly disposed in the channel 48 of the second door guide 26.

The hinge member 20 of the stowage compartment 10 has a first end 130 and a second end 132. The first end 120 includes a pair of holes 134 each through which is disposed and rotatably supported one of the pair of pins 98 of the hinge feature 98. The second end 132 includes a pin 136 disposed on each side of the hinge member 20. The pins 136 are rotatably supported by the hinge bores 34 of the bin frame 14. A second resilient member or spring 138 is disposed on the pins 136 of the hinge member 20 to provide a force to rotate the hinge member 20 and therefore urge the door assembly 16 in the −X direction.

Figure 3:
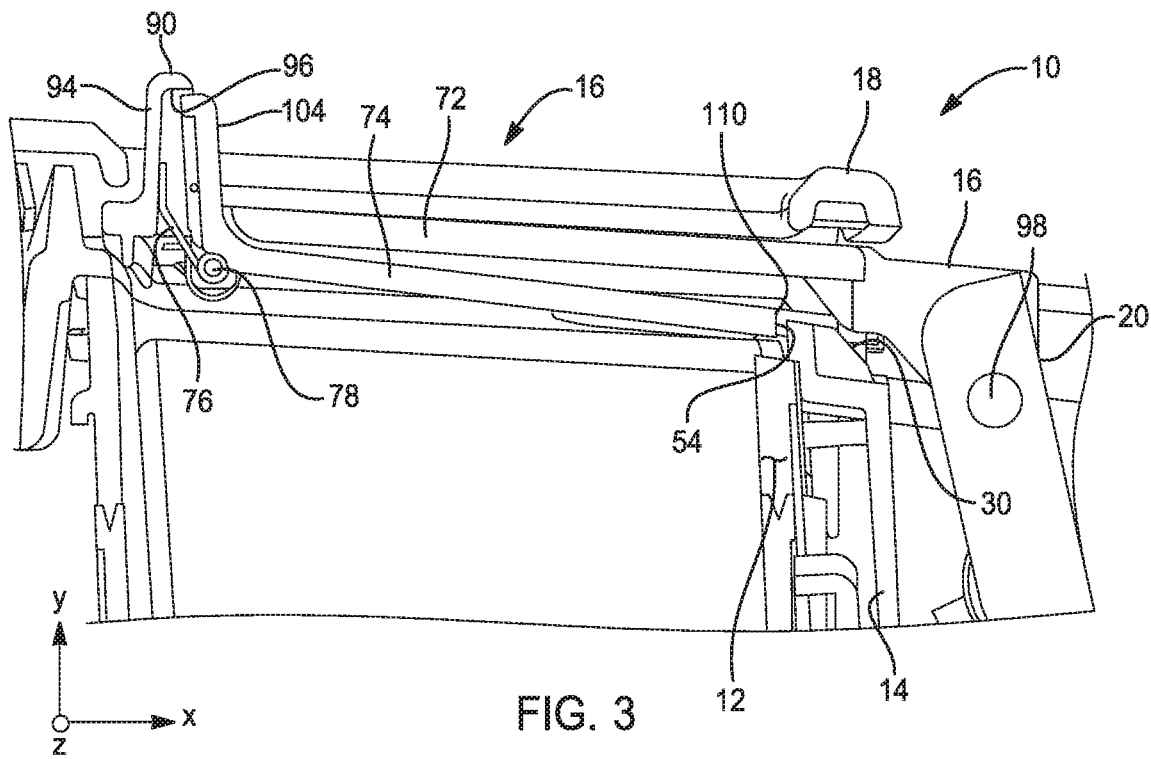
FIG. 3 is a cross-sectional view of a vehicle interior stowage compartment with a door in an closed and latched position according to the principles of the present disclosure.

The door frame 18, shown in FIGS. 1 and 3, includes an opening 140 that coincides with the opening 22 of the bin frame 14. The door frame 18 is disposed on top of the door assembly 16 such that the top surface 142 of the door assembly 16 is mostly visible through the opening 140 of the door frame 18 when the door assembly 16 is in an first or closed position (see FIG. 3). When the door assembly 16 is in a second or open position, only the handle 90 of the door 72 and the release button 104 of the latch 74 are visible and accessible through the opening 22 of the door frame 18.

Turning attention more closely to FIGS. 3-6, the function of the stowage compartment 10 is illustrated and will now be described. As shown in FIG. 3, the door assembly is located in the first or closed position. The first latch surface 110 of the latch 74 is disposed opposing and in contact with the contact surface 54 of the first latch feature 30 of the bin frame 14. Thus, unless the button 104 of the latch 74 is compressed, the first latch feature 30 would prevent the door assembly 16 from sliding from the closed position.

Figure 4:
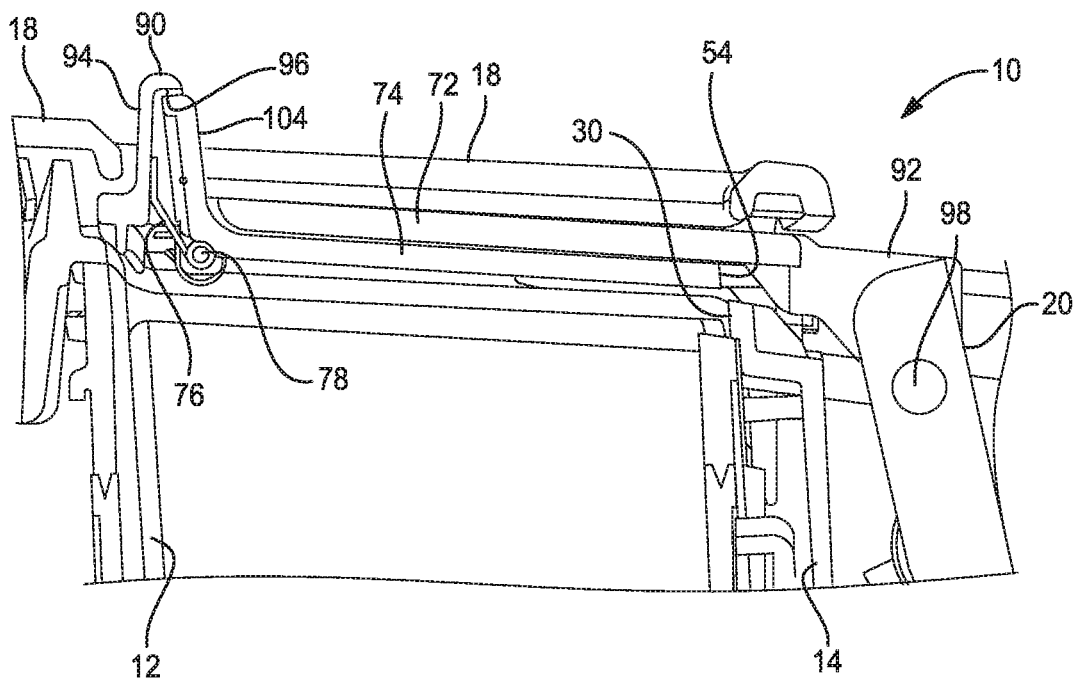
FIG. 4 is a cross-sectional view of a vehicle interior stowage compartment with a door in an closed and unlatched position according to the principles of the present disclosure.

Turning now to FIG. 4, the latch 74 has rotated such that the release button 104 of the latch 74 is compressed and moved towards the handle 90 of the door 72. Therefore, the first latch surface 110 of the latch 74 is raised in the Y direction due to the pivoting feature of the pin or axle 78. The second end 118 of the latch 74 rises above the first latch feature 30 so that the door assembly 16 is free to move in the X direction without impedance.

Figure 5:
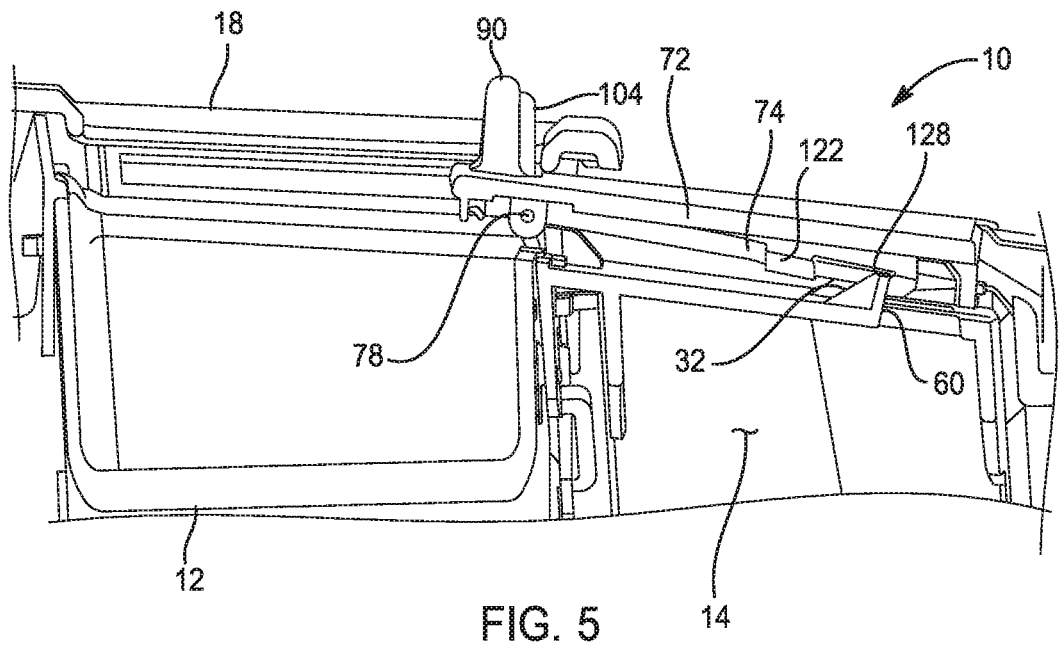
FIG. 5 is a cross-sectional view of a vehicle interior stowage compartment with a door in an opened and latched position according to the principles of the present disclosure.
Figure 6:
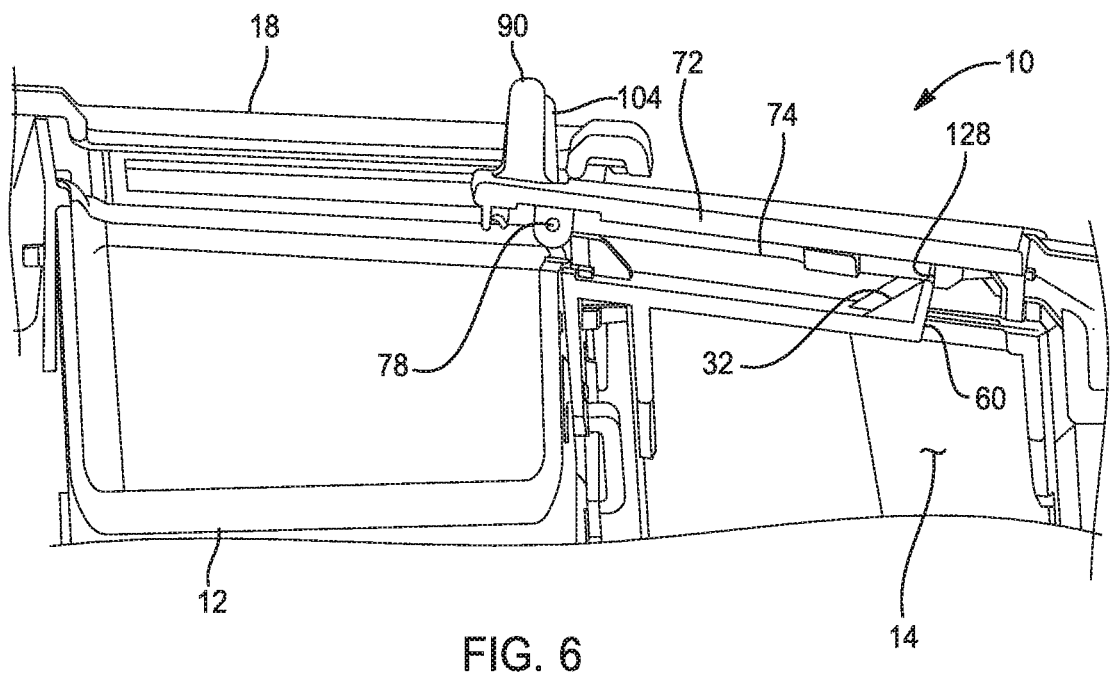
FIG. 6 is a cross-sectional view of a vehicle interior stowage compartment with a door in an opened and unlatched position according to the principles of the present disclosure.
Figure 7:
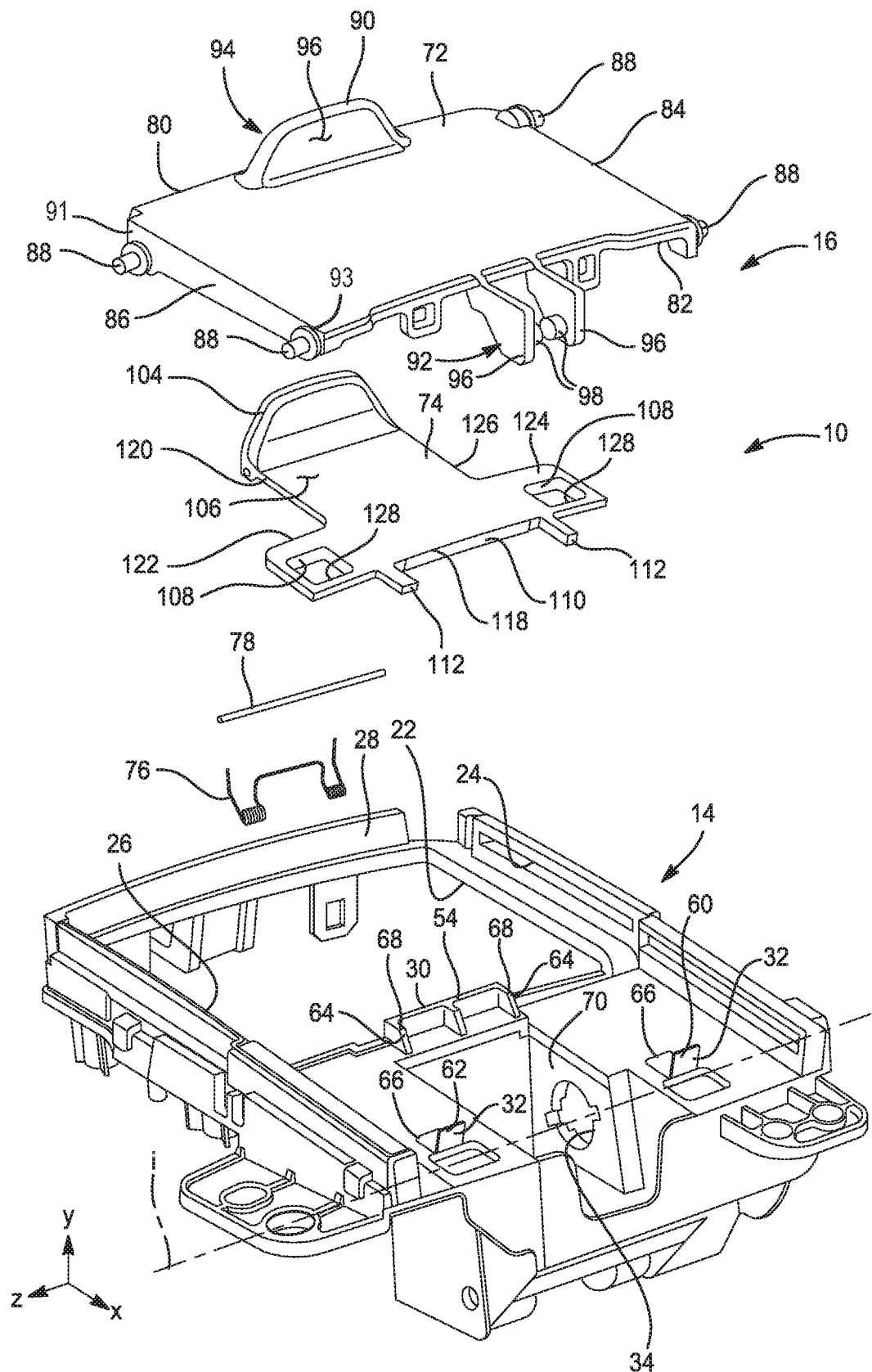
FIG. 7 is a perspective exploded view of a vehicle interior stowage compartment according to the principles of the present disclosure.

As shown now in FIG. 5, the door assembly 16 has moved in the X direction. When the button 104 has released, the latch 74 returns to a locked position with the second latch surface 128 of the rectangular holes 108 of the latch 74. The second latch surfaces 128 are then disposed opposing and in contact with the contact surface 60 of the pair of second latch features 32 of the bin frame 14.

While examples have been described in detail, those familiar with the art to which this disclosure relates will recognize various alternative designs and examples for practicing the disclosed method within the scope of the appended claims.

The following is claimed:

1. A stowage compartment for a vehicle, the stowage compartment comprising:
    a bin comprising an opening and an interior compartment;
    a bin frame comprising an opening, a first and second door guide, and a first and second latch feature, and wherein the opening is disposed proximate a first end of the bin frame, the opening of the bin is aligned with the opening of the bin frame to provide access to the interior compartment of the bin through the opening, the first door guide is disposed on a first side of the opening, the second door guide is disposed on a second side of the opening opposite the first side, the first latch feature is disposed proximate a third side of the opening which is opposite the first end of the bin frame, and the second latch feature is disposed proximate a second end of the bin frame, and
    a door assembly comprising a door, a latch, a resilient member, and an axle, and wherein the door of the door assembly comprises a handle and a first, second, third, and fourth pins, the first and second pins are slidingly disposed in the first door guide, the third and fourth pins are slidingly disposed in the second door guide, the latch comprises a button, a first and second latch surfaces, the button of the latch is disposed within the handle of the door, the axle is disposed through each of the door and the latch such that the latch is pivotably mounted to the door, the resilient member provides a force to oppose the handle of the door from the button of the latch; and
    wherein the door assembly is disposed in one of a first and a second position, the first position includes the door assembly disposed in the opening of the bin frame and the first latch surface of the latch opposes the first latch feature of the bin frame preventing the door assembly from sliding relative to the bin frame, and the second position includes the door assembly disposed proximate the second end of the bin frame and the second latch surface of the latch opposes the second latch feature of the bin frame from preventing the door assembly from sliding relative to the bin frame.

2. The stowage compartment of claim 1 wherein the first pin of the door extends from a first edge of the door proximate a second edge of the door, the second pin extends from the first edge of the door proximate a third edge of the door opposite the second edge of the door, the third pin of the door extends from a fourth edge of the door opposite the first edge of the door and proximate the second edge of the door, and the fourth pin of the door extends from the fourth edge of the door proximate the third edge of the door.

3. The stowage compartment of claim 2 wherein the handle of the door comprises a first and a second side, is disposed proximate the second edge of the door extending from an outer surface of the door, the first side has a continuous surface, the second side having an opening, the latch of the door assembly disposed having the button of the latch disposed on the interior of the handle, and the button including a continuous surface disposed in the opening of the second side of the handle.

4. The stowage compartment of claim 3 further comprising a hinge member, and wherein the hinge member comprises a first end and a second end, the first end is rotatably supported by the third edge of the door, and the second end is rotatably supported by a recessed housing of the bin frame.

5. The stowage compartment of claim 4 wherein the latch of the door assembly further comprises a first end, a second end, a lever arm, a first flange, and a second flange, and wherein the button of the latch is disposed at the first end of the latch, the lever arm extends from the button to the second end of the latch, the first flange extends from a first side of the lever arm proximate the second end of the flange, the second flange extends from a second side of the lever arm proximate the second end of the flange, the second latch surface is disposed in the first flange, a third latch surface is disposed in the second flange, and the first latch surface is disposed on the second edge of the latch.

6. The stowage compartment of claim 5 wherein the first latch feature of the bin frame comprises a first contact surface and the first contact surface extends perpendicularly from a top surface of the bin frame and opposes a door stop disposed on a fourth side of the opening of the bin frame.

7. The stowage compartment of claim 6 wherein the second latch feature of the bin frame comprises a second contact surface extending perpendicularly from the top surface of the bin frame, the second contact surface faces the opposite direction of the first contact surface of the first latch feature.

8. The stowage compartment of claim 7 wherein the bin frame further comprises a third latch feature comprising a third contact surface extending perpendicularly from the top surface of the bin frame and the third contact surface faces the same direction of the second contact surface of the second latch feature.

9. The stowage compartment of claim 8 wherein when the door assembly is in the second position the second latch surface of the latch opposes the second contact surface of the second latch feature of the bin frame, the third latch surface of the latch opposes the third contact surface of the third latch feature of the bin frame.

10. A stowage compartment for a vehicle, the stowage compartment comprising:
   a bin comprising an opening and an interior compartment;
   a bin frame comprising an opening, a first and second door guide, a recessed housing, and a first and second latch feature, and wherein opening is disposed proximate a first end of the bin frame, the opening of the bin is aligned with the opening of the bin frame to provide access to the interior compartment of the bin through the opening, the first door guide is disposed on a first side of the opening, the second door guide is disposed on a second side of the opening opposite the first side, the first latch feature is disposed proximate a third side of the opening which is opposite the first end of the bin frame, and the second latch feature is disposed proximate a second end of the bin frame;
   a door assembly comprising a door, a latch, a resilient member, and an axle, and wherein the door of the door assembly comprises a handle and a first, second, third, and fourth pins, the first pin of the door extends from a first edge of the door proximate a second edge of the door, the second pin extends from the first edge of the door proximate a third edge of the door opposite the second edge of the door, the third pin of the door extends from a fourth edge of the door opposite the first edge of the door and proximate the second edge of the door, and the fourth pin of the door extends from the fourth edge of the door proximate the third edge of the door, the first and second pins are slidingly disposed in the first door guide, the third and fourth pins are slidingly disposed in the second door guide, the latch comprises a button, a first and second latch surfaces, the button of the latch is disposed within the handle of the door, the axle is disposed through each of the door and the latch such that the latch is pivotably mounted to the door, the resilient member provides a force to oppose the handle of the door from the button of the latch, and
   a hinge member comprising a first end and a second end, the first end is rotatably supported by the third edge of the door, and the second end is rotatably supported by the recessed housing of the bin frame; and
   wherein the door assembly is disposed in one of a first and a second position, the first position includes the door assembly disposed in the opening of the bin frame and the first latch surface of the latch opposes the first latch feature of the bin frame preventing the door assembly from sliding relative to the bin frame, and the second position includes the door assembly disposed proximate the second end of the bin frame and the second latch surface of the latch opposes the second latch feature of the bin frame from preventing the door assembly from sliding relative to the bin frame.

11. The stowage compartment of claim 10 wherein the handle of the door comprises a first and a second side, is disposed proximate the second edge of the door extending from an outer surface of the door, the first side has a continuous surface, the second side having an opening, the latch of the door assembly disposed having the button of the latch disposed on the interior of the handle, and the button including a continuous surface disposed in the opening of the second side of the handle.

12. The stowage compartment of claim 11 wherein the latch of the door assembly further comprises a first end, a second end, a lever arm, a first flange, and a second flange, and wherein the button of the latch is disposed at the first end of the latch, the lever arm extends from the button to the second end of the latch, the first flange extends from a first side of the lever arm proximate the second end of the flange, the second flange extends from a second side of the lever arm proximate the second end of the flange, the second latch surface is disposed in the first flange, a third latch surface is disposed in the second flange, and the first latch surface is disposed on the second edge of the latch.

13. The stowage compartment of claim 12 wherein the first latch feature of the bin frame comprises a first contact surface and the first contact surface extends perpendicularly from a top surface of the bin frame and opposes a door stop disposed on a fourth side of the opening of the bin frame.

14. The stowage compartment of claim 13 wherein the second latch feature of the bin frame comprises a second contact surface extending perpendicularly from the top surface of the bin frame, the second contact surface faces the opposite direction of the first contact surface of the first latch feature.

15. The stowage compartment of claim 14 wherein the bin frame further comprises a third latch feature comprising a third contact surface extending perpendicularly from the top surface of the bin frame and the third contact surface faces the same direction of the second contact surface of the second latch feature.

16. The stowage compartment of claim 15 wherein when the door assembly is in the second position the second latch surface of the latch opposes the second contact surface of the second latch feature of the bin frame, the third latch surface of the latch opposes the third contact surface of the third latch feature of the bin frame.

17. A stowage compartment for a vehicle, the stowage compartment comprising:
   a bin comprising an opening and an interior compartment;
   a bin frame comprising an opening, a first and second door guide, a recessed housing, a door stop, and a first and second latch feature, and wherein opening is disposed proximate a first end of the bin frame, the opening of the bin is aligned with the opening of the bin frame to provide access to the interior compartment of the bin through the opening, the first door guide is disposed on a first side of the opening, the second door guide is disposed on a second side of the opening opposite the first side, the first latch feature is disposed proximate a third side of the opening which is opposite the first end of the bin frame, and the second latch feature is disposed proximate a second end of the bin frame, the first latch feature of the bin frame comprises a first contact surface and the first contact surface extends perpendicularly from a top surface of the bin frame and opposes the door stop disposed on a fourth side of the opening of the bin frame, the second latch feature of the bin frame comprises a second contact surface extending perpendicularly from the top surface of the bin frame, and the second contact surface faces the opposite direction of the first contact surface of the first latch feature;

a door assembly comprising a door, a latch, a resilient member, and an axle, and wherein the door of the door assembly comprises a handle and a first, second, third, and fourth pins, the first pin of the door extends from a first edge of the door proximate a second edge of the door, the second pin extends from the first edge of the door proximate a third edge of the door opposite the second edge of the door, the third pin of the door extends from a fourth edge of the door opposite the first edge of the door and proximate the second edge of the door, and the fourth pin of the door extends from the fourth edge of the door proximate the third edge of the door, the first and second pins are slidingly disposed in the first door guide, the third and fourth pins are slidingly disposed in the second door guide, the latch comprises a button, a first and second latch surfaces, the button of the latch is disposed within the handle of the door, the axle is disposed through each of the door and the latch such that the latch is pivotably mounted to the door, the resilient member provides a force to oppose the handle of the door from the button of the latch, and a hinge member comprising a first end and a second end, the first end is rotatably supported by the third edge of the door, and the second end is rotatably supported by the recessed housing of the bin frame; and wherein the handle of the door comprises a first and a second side, is disposed proximate the second edge of the door extending from an outer surface of the door, the first side has a continuous surface, the second side having an opening, the latch of the door assembly disposed having the button of the latch disposed on the interior of the handle, the button including a continuous surface disposed in the opening of the second side of the handle, the door assembly is disposed in one of a first and a second position, the first position includes the door assembly disposed in the opening of the bin frame and the first latch surface of the latch opposes the first latch feature of the bin frame preventing the door assembly from sliding relative to the bin frame, and the second position includes the door assembly disposed proximate the second end of the bin frame and the second latch surface of the latch opposes the second latch feature of the bin frame from preventing the door assembly from sliding relative to the bin frame.

18. The stowage compartment of claim 17 wherein the latch of the door assembly further comprises a first end, a second end, a lever arm, a first flange, and a second flange, and wherein the button of the latch is disposed at the first end of the latch, the lever arm extends from the button to the second end of the latch, the first flange extends from a first side of the lever arm proximate the second end of the flange, the second flange extends from a second side of the lever arm proximate the second end of the flange, the second latch surface is disposed in the first flange, a third latch surface is disposed in the second flange, and the first latch surface is disposed on the second edge of the latch.

19. The stowage compartment of claim 18 wherein the first latch feature of the bin frame comprises a first contact surface and the first contact surface extends perpendicularly from a top surface of the bin frame and opposes a door stop disposed on a fourth side of the opening of the bin frame.

20. The stowage compartment of claim 19 wherein the bin frame further comprises a third latch feature comprising a third contact surface extending perpendicularly from the top surface of the bin frame and the third contact surface faces the same direction of the second contact surface of the second latch feature, and when the door assembly is in the second position the second latch surface of the latch opposes the second contact surface of the second latch feature of the bin frame, the third latch surface of the latch opposes the third contact surface of the third latch feature of the bin frame.

* * * * *